United States Patent [19]

Helfen

[11] 3,835,389

[45] Sept. 10, 1974

[54] CARRIER CURRENT SYSTEM

[75] Inventor: Ralph K. Helfen, Niles, Ill.

[73] Assignee: P. R. Mallory & Co. Inc., Indianapolis, Ind.

[22] Filed: July 11, 1973

[21] Appl. No.: 378,092

Related U.S. Application Data

[63] Continuation of Ser. No. 176,221, Aug. 30, 1971, abandoned.

[52] U.S. Cl. ..................... 325/64, 325/37, 325/113, 325/394, 340/310 R

[51] Int. Cl. ............................................ H04b 1/00

[58] Field of Search ........... 325/26, 37, 63, 64, 113, 325/394, 489, 490; 330/19, 21, 31; 331/116 A, 116 R; 333/72; 307/2; 340/310 A, 310 R

[56] References Cited

UNITED STATES PATENTS

| | | | |
|---|---|---|---|
| 3,421,109 | 1/1969 | Wiggins et al. | 333/72 |
| 3,460,121 | 8/1969 | Wattenburg | 340/310 A |
| 3,487,237 | 12/1969 | Krenke | 331/116 R |
| 3,594,584 | 7/1971 | Woods | 340/310 A |
| 3,659,280 | 4/1972 | Donohod | 340/310 R |

*Primary Examiner*—Albert J. Mayer
*Attorney, Agent, or Firm*—Charles W. Hoffman; Robert F. Meyer

[57] ABSTRACT

A transmitter and a receiver are both connected to a power source. A piezoelectric resonator means is used in the transmitter to determine the frequency of a transmitted signal and a piezoelectric resonator means is used in the receiver for selective reception of the desired transmitted signal.

10 Claims, 6 Drawing Figures

CARRIER CURRENT SYSTEM

This application is a continuation of SN 176,221, filed Aug. 30, 1971, now abandoned.

This invention relates to a carrier current system, and more particularly to a carrier current system which is particularly adaptable to signaling systems such as audible alarms systems.

Signaling systems are becoming increasingly used in homes and other establishments in conjunction with alarm systems. In many such signaling systems there may be a transmitter and a receiver plugged into a common power source. As will become apparent, the present invention provides a signal at a remote location separate and distinct from the transmitter, even though the transmitter and the receiver are operated from the same power source, such as found in household wiring networks. Additionally, in the present system the transmitter and receiver are connected to the same power source and operable therefrom without interference from other devices which may be also connected to the power source.

The present invention, therefore, relates to a carrier current system and has as one of its objects the provision of such a system which is operable from a common power source without interference with any other electrical signaling systems connected to the source.

A further object of the invention is the provision of a carrier current system having a transmitter and a receiver operable from a common power source which includes a monolithic single body resonator means for selective reception of the desired transmitted signal.

Yet another object of the invention is the provision of a carrier current system operable off of a common power source having a high degree of reliability, noise rejection, and good selectivity which allows more than one system to operate from the same power source.

Still another object of the invention is the provision of a carrier current system having a transmitter including an oscillator means having a piezoelectric resonator means, a filter means, and a power supply means, the transmitter being connected to a power source, and a receiving means including a coupling means, a tuned amplifier means having at least one piezoelectric resonator means, a detecting means, and a power supply means, the receiving means also being connected to the same power source.

Another object of the invention is the provision of a signaling system having a transmitter and a receiver operable from either an AC or DC power source.

These and other objects of the invention will be apparent from the following description taken in conjunction with the accompanying drawings wherein.

Generally speaking, the objects of the invention are accomplished by providing a carrier current system comprising a transmitter and a receiver both of which may be connected to a common power source and be operable therefrom without interference to other electrical signaling devices connected to the power source. The transmitter includes an oscillator means having a monolithic single body resonator means providing an output of a predetermined frequency of oscillation, a filter means coupled to the oscillator means permitting the output of predetermined frequency of oscillation to pass but to prevent feedback of other signals and the power source, and a power supply means connected to and providing power to the oscillator means. The receiver includes a coupling means permitting the signal from the transmitter to pass to a tuned amplifier and blocking the power source from the tuned amplifier. The tuned amplifier includes at least one monolithic single body resonator means connected to transistor amplifier means to provide an output signal at the desired frequency and attenuating unwanted signals; detecting means connected to the tuned amplifier means providing an output signal of predetermined polarity, and power supply means connected to and providing power to the tuned amplifier means. The system may also include an indication means connected to the detecting means which when energized from the output signal of predetermined polarity provides an indication which may be used to provide a function such as an audible alarm.

Figure 1:
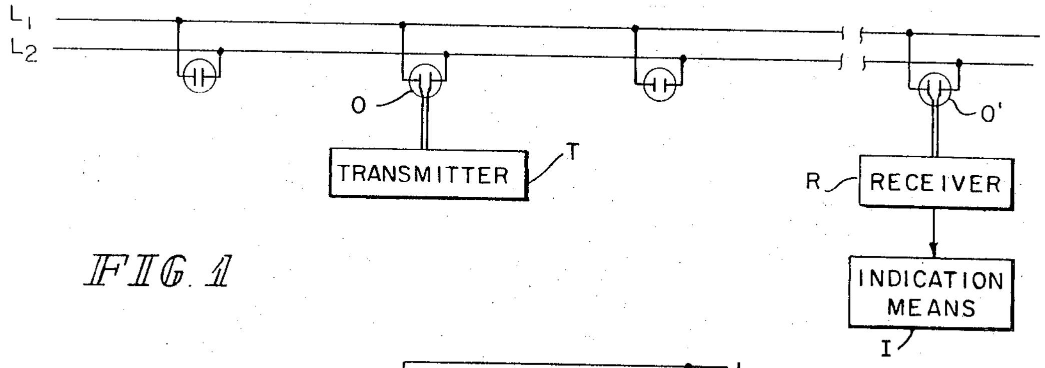
FIG. 1 is a schematic showing the relationship of a transmitter and a receiver.

Referring now to the drawings, there is shown in FIG. 1 a power supply $L_1$ $L_2$ to which has been connected a transmitter means T and a receiving means R at locations O and O′ which are spaced at intervals along a supply line. The supply line could be a typical line found in a home or homes, for example, supplying 120 volts AC. As will become apparent, the transmitter means and the receiving means will be operable off the common supply line without any interference with any other electrical device which may be connected to the same power source.

Figure 2:
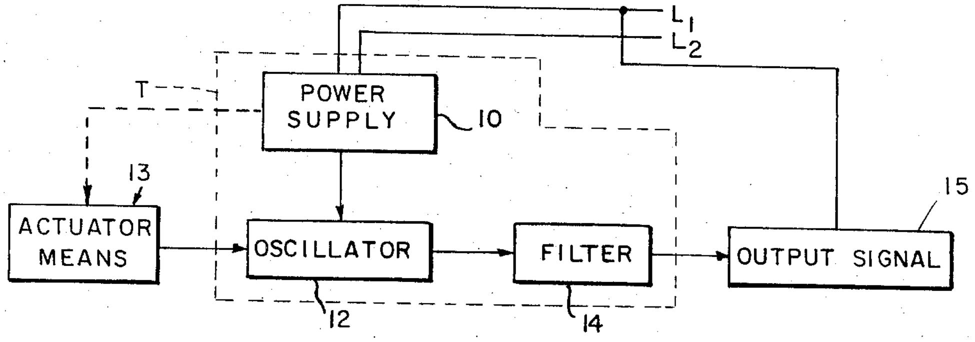
FIG. 2 is a block diagram illustrating the elements of the transmitter.
Figure 4:
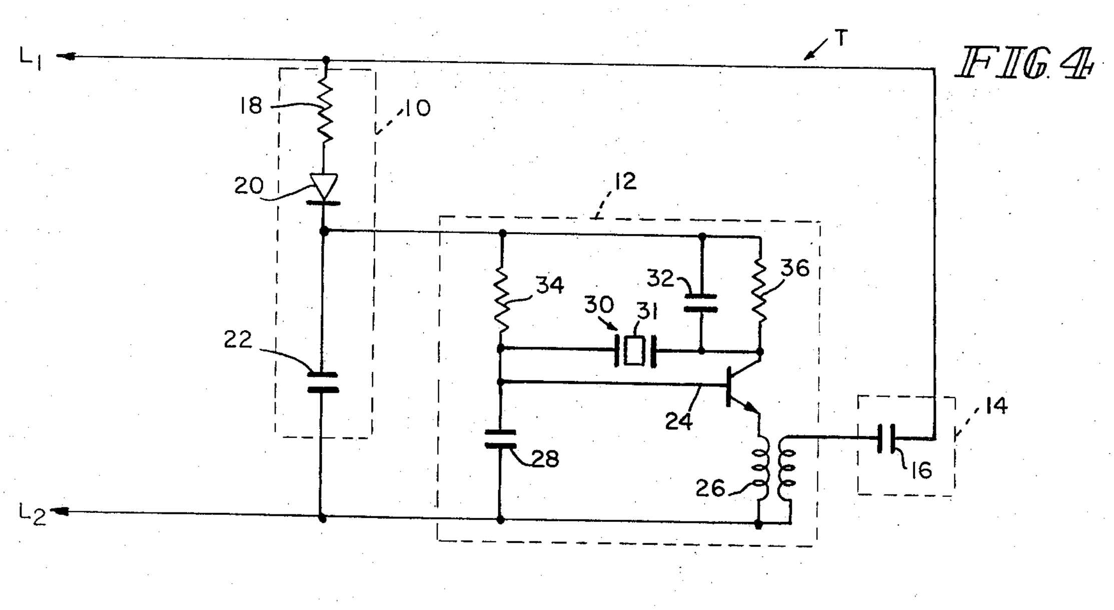
FIGS. 4 and 5 are wiring diagrams of the transmitter and receiver respectively.

Referring to FIGS. 2 and 4, transmitter means T includes a power supply means 10, an oscillator means 12, and a filter means 14. Power supply means 10 is connected to the oscillator means and supplies electrical energy thereto and includes a series combination of resistor 18, diode 20, and capacitor 22. Filter means 14 includes a capacitor 16. Oscillator means 12 includes a transistor 24, a transformer means 26 and capacitor 28 connected to the base of transistor 24 and acting as a base bypass, capacitor 32 which is connected in parallel to resistor means 36 and acts as a collector by pass for the transistor 24, and a monolithic single body resonator means such as a piezoelectric resonator means 30. Resistor 36 serves as a collector load resistor for transistor means 24. Resistor 34 provides DC base current for transistor means 24. The piezoelectric resonator means 30 is connected between the collector and the base of transistor 24. Transistor 24 oscillates at a frequency predetermined by the piezoelectric resonator means 30. Piezoelectric resonator means 30 includes a piezoelectric ceramic element 31 which vibrates at a frequency determined by its size and composition.

Figure 6:
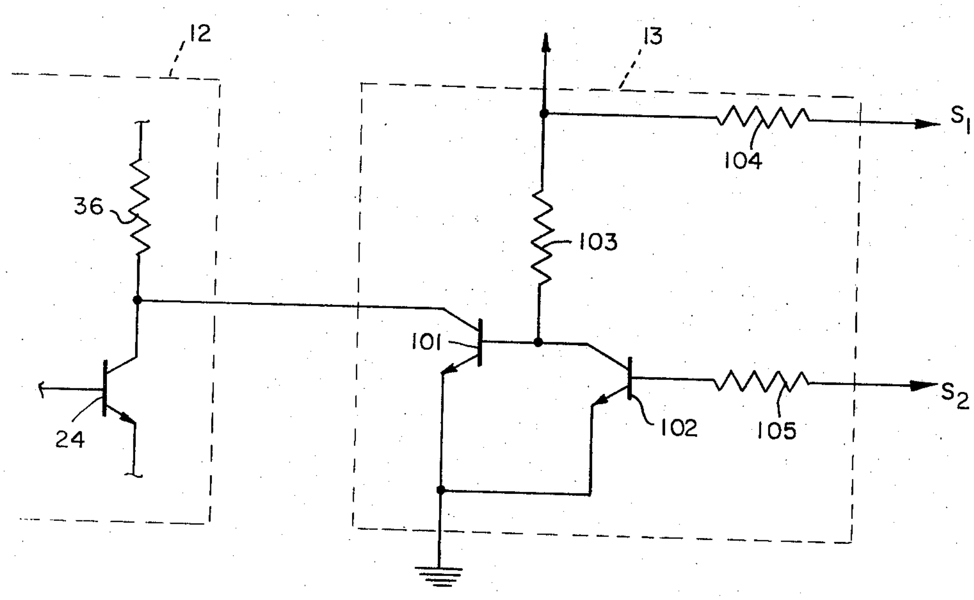
FIG. 6 is a wiring diagram of an actuator means which turns on the transmitter.

In operation, the transmitter means is connected to a power source through terminals $L_1$ $L_2$. When actuator means 13 (FIG. 2) is activated by some suitable means, such as by pushing a button or a relay contact closure, oscillator means 12 is turned on thereby supplying a signal to filter means 14. For example, a button may be pushed to sound an alarm to supply an RF signal. FIG. 6 illustrates a suitable actuator means 13 of the present invention. Filter means 14 permits an output signal 15 of predetermined frequency of oscillation, as controlled by the piezoelectric resonator means 30, to be supplied to the power supply line and at the same time prevent the power source to be transmitted back to the oscillator. The output signal of the predetermined frequency of oscillation will be impressed on the voltage normally flowing through the supply line which will be picked up by the receiving means R. Such supply line may also be transmitting signals from other devices such as radios, televisions, etc.

Figure 3:
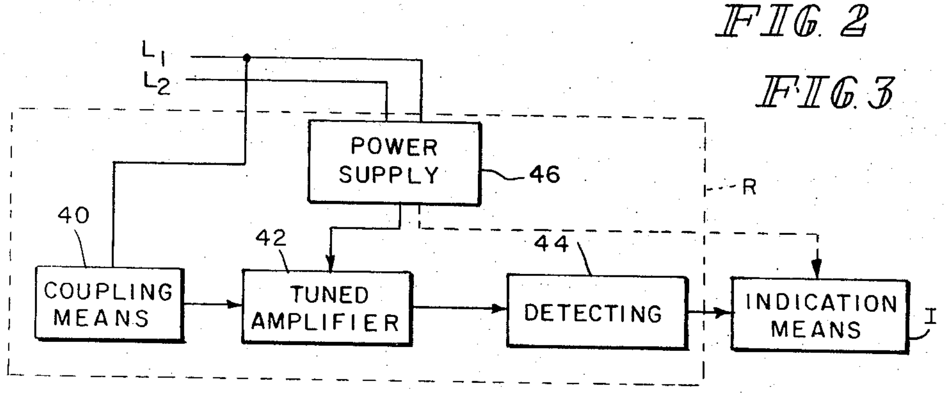
FIG. 3 is a block diagram illustrating the elements of the receiver.
Figure 5:
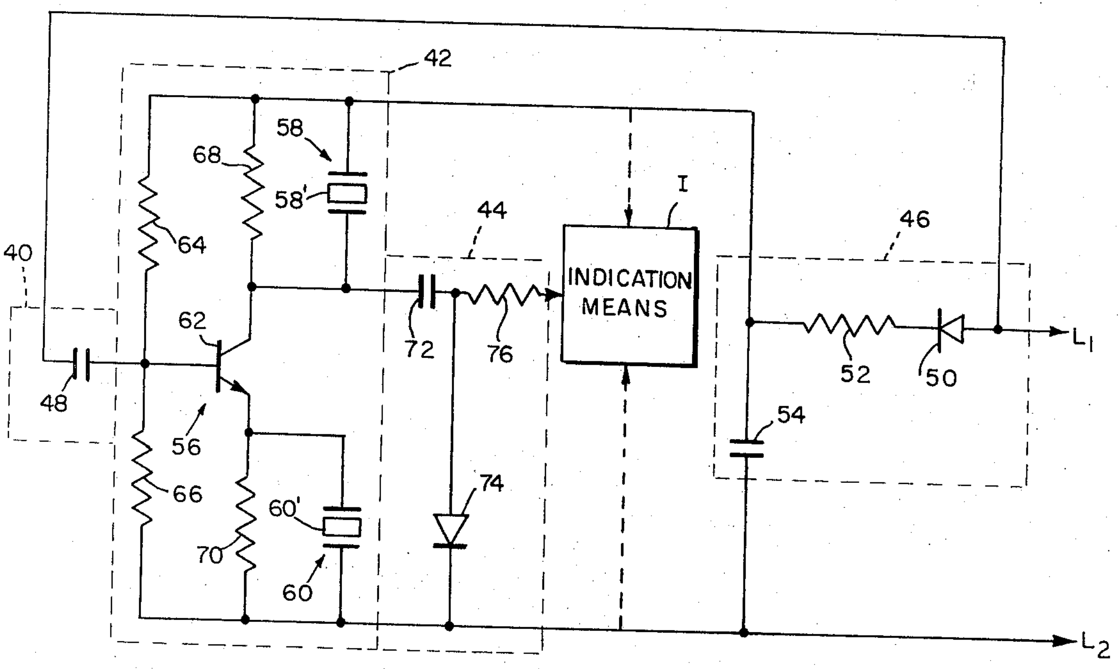

Referring now to FIGS. 3 and 5 the receiving means of the invention is shown. Receiving means R includes a coupling means 40, a tuned amplifier means 42 connected to the coupling means, a detecting means 44 connected to the tuned amplifier means, and power supply means 46 which supplies power to the tuned amplifier. As shown in FIG. 5, coupling means 40 includes a capacitor 48. Power supply means 46 includes a series combination of diode 50, resistor 52 and capacitor 54. Tuned amplifier 42 includes a transistor amplifier 56 and two monolithic single body piezoelectric resonator means 58 and 60. Transistor amplifier means 56 includes transistor 62, biasing resistors 64 and 66 and load resistors 68 and 70. As shown, the base of the transistor is connected to the coupling means 40, the collector to piezoelectric resonator means 58, and the emitter to piezoelectric resonator means 60. The piezoelectric resonator means are similar to that of the resonator means of the transmitter means shown in FIG. 4, and include a piezoelectric element 58' and 60' which vibrate at a frequency determined by the size and composition of the element. Piezoelectric resonator means 58 and 60 provide the selectivity for the tuned amplifier means. Resonator 58 is manufactured so that its high impedance anti-resonance is at the desired signal frequency. Therefore at frequencies other than the desired frequency, the impedance of the resonator is less, thereby attenuating undesired signals. Resonator 60 is manufactured so that its low impedance series resonant frequency is at the desired frequency, thereby acting as an effective tuned emitter bypass for transistor 62. Detecting means 44 includes capacitor 72 in parallel with forward biased diode 74, and current limiting resistor 76. As shown, the capacitor of the detecting means is connected to the collector of the transistor 62. The detecting means 44 removes the unwanted polarity of the signal from the tuned amplifier thus providing an output signal of a predetermined polarity. In the case of the present invention the detecting means removes the positive component of the signal emanating from the tuned amplifier means to deliver only the negative portion of the signal.

In operation, the receiver means is connected to the line (FIG. 1) of the power source $L_1$ and $L_2$. Power supply means 46 supplies power to the tuned amplifier. Coupling means 40 permits the signal from the transmitter to be applied to the tuned amplifier means 42. More specifically, in the present instance, coupling means 40 permits the RF signal for the alarm to be applied to the tuned amplifier. Tuned amplifier means 42 selects and amplifies the desired signal and applies it to the detecting means 44, which removes the unwanted polarity from the signal to provide an output signal of a predetermined polarity.

The output from detecting means 44, that is the received signal, may be supplied to an indication means I. The indication means may include numerous devices: relays, SCRs, Triacs, etc., which may in turn energize a function such as an audible alarm.

Referring to FIG. 6 there is shown an embodiment of actuator means 13. In the present invention actuator means 13 turns on oscillator means 12 and also provides a relatively high degree of electrical isolation from the power source. As indicated in FIG. 2, the actuator means may, if desired, be operable from power supply 10. Actuator means 13 includes transistor switch 101, inverter transistor 102 and resistors 103, 104, and 105, and contacts $S_1$ and $S_2$. Transistor switch 101 is forward biased by resistor 103. As shown the transistors are connected together collector to base, and emitter to emitter, the collector of transistor 101 being connected to oscillator 12. Transistor 101 conducts heavily thereby preventing the oscillator 12 from operating. Inverter transistor 102 is used to turn off transistor 101 thereby allowing oscillator 12 to operate. Inverter transistor 102 conducts when contacts $S_1$ and $S_2$ are closed (such as by a push button), thus providing base current for transistor 102 through resistors 104 and 105.

What is claimed is:

1. In a carrier current system including a transmitter and a receiver adapted to be connected to a common power source:

a. said transmitter including:
   1. Oscillator means comprising a transistor, a transformer having one side connected to the emitter of said transistor, a capacitor acting as a base bypass for said transistor, a capacitor acting as a collector bypass for said transistor, and a piezoelectric resonator connected between said collector and base of said transistor providing an output of a predetermined frequency from said transformer,
   2. a filter means coupled to the other side of said transformer permitting said output of a predetermined frequency of oscillation to pass and preventing feedback of said power source,
   3. first power supply means connected to and providing power to said oscillator means;

b. receiving means connected to said common power source including:
   1. a coupling means permitting said output of a predetermined frequency of oscillation to pass while blocking said power source,
   2. tuned amplifier means connected to said coupling means including at least one piezoelectric resonator means connected to a transistor amplifier means and providing an output signal,
   3. detecting means connected to said tuned amplifier means providing an output signal of predetermined polarity, and
   4. second power supply means connected to said tuned amplifier means, and c. actuator means connected to said oscillator means, actuating said actuator means turning on said oscillator means.

2. In a carrier current means according to claim 1 wherein said first filter means and said coupling means each include a capacitor.

3. In a carrier current system according to claim 1 wherein said first power supply means includes a diode-capacitor series combination.

4. In a carrier current system according to claim 1 wherein said second power supply means includes a diode-capacitor series combination.

5. In a carrier current system according to claim 1 wherein both said first and second power supply means includes a diode-capacitor series combination.

6. In a carrier current means according to claim 1 wherein said tuned amplifier means includes two piezoelectric resonator means, one each connected to a side of a transistor amplifier means.

7. In a carrier current means according to claim 6 wherein said transistor amplifier means includes a transistor collector connected to one of said piezoelectric resonator means, emitter to the other of said piezoelectric resonator means, and base to said coupling means.

8. In a carrier current means according to claim 1 wherein said detecting means includes a diode-capacitor parallel combination.

9. In a carrier current means according to claim 1 wherein said actuator means provides a high degree of electrical isolation from said power source.

10. In a carrier current means according to claim 9 wherein said actuator means includes first and second transistors, and cooperating bias resistor sconnected between electrical contacts, one of said transistors connected to collector to said oscillator means, base to collector of the other transistor, and emitter to the emitter of the other transistor.

* * * * *

UNITED STATES PATENT OFFICE

CERTIFICATE OF CORRECTION

Patent No. 3,835,389 Dated 09/10/74

Inventor(s) Ralph K. Helfen

It is certified that error appears in the above-identified patent and that said Letters Patent are hereby corrected as shown below:

Col. 1, line 13, Insert ---,--- after location

Col. 6, line 10 Delete "resistor sconnected" Insert ---resistors connected---

Signed and sealed this 29th day of April 1975.

(SEAL)
Attest:

RUTH C. MASON
Attesting Officer

C. MARSHALL DANN
Commissioner of Patents and Trademarks